United States Patent
Bevers et al.

(10) Patent No.: US 12,152,223 B2
(45) Date of Patent: *Nov. 26, 2024

(54) PROCESS FOR THE PREPARATION OF A STABLE BEVERAGE

(71) Applicant: DSM IP ASSETS B.V., Heerlen (NL)

(72) Inventors: Loes Elizabeth Bevers, Echt (NL); Johanna Henrica Gerdina Maria Mutsaers, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,967

(22) Filed: Jan. 11, 2023

(65) Prior Publication Data

US 2023/0212486 A1    Jul. 6, 2023

Related U.S. Application Data

(63) Continuation of application No. 17/040,771, filed as application No. PCT/EP2019/057531 on Mar. 26, 2019, now Pat. No. 11,578,292.

(30) Foreign Application Priority Data

Mar. 29, 2018 (EP) ..................... 18164942

(51) Int. Cl.
| | |
|---|---|
| *C12C 5/00* | (2006.01) |
| *C12C 7/24* | (2006.01) |
| *C12C 12/00* | (2006.01) |
| *A23L 2/84* | (2006.01) |

(52) U.S. Cl.
CPC ............... *C12C 5/004* (2013.01); *C12C 7/24* (2013.01); *C12C 12/002* (2013.01); *A23L 2/84* (2013.01); *A23V 2002/00* (2013.01)

(58) Field of Classification Search
CPC ......... C12C 5/004; C12C 7/24; C12C 12/002; A23L 2/66; A23L 2/84
See application file for complete search history.

(56) References Cited

U.S. PATENT DOCUMENTS

| | | |
|---|---|---|
| 8,119,171 B2 | 2/2012 | Lopez et al. |
| 2009/0297689 A1 | 12/2009 | Edens et al. |

FOREIGN PATENT DOCUMENTS

| | | |
|---|---|---|
| CN | 101479380 A | 7/2009 |
| EP | 1914298 A1 | 7/2005 |
| WO | 2002046381 A2 | 6/2002 |
| WO | 2008000714 A1 | 1/2008 |
| WO | 2015177153 A1 | 11/2015 |
| WO | 2017009100 A1 | 1/2017 |
| WO | 2017085210 A1 | 5/2017 |

OTHER PUBLICATIONS

Tarcsa et al., "The Fate of Trichohyalin: Sequential Post-Translational Modifications by Peptidyl-Arginine Deiminase and Transglutaminases", Journal of Biological Chemistry, vol. 272, No. 44, Oct. 31, 1997, pp. 27893-27901.
Azuma, Norihiro et al., "Role of the Arginyl Residues of κ-Casein in Micelle Formation—Effect of Deimination on αs1-κ-Casein Complex Formation", Int. Dairy Journal, Jan. 1, 1994, pp. 193-204, vol. 4, No. 3.
International Search Report issued in counterpart application No. PCT/EP2019/057531, mailed Jul. 15, 2019.
Nagodawithana and Reed, "Enzymes in food processing" 3rd edition, Academic press Inc., San Diego, Chapter 17, Section V, p. 448-449.

*Primary Examiner* — Vera Stulii
(74) *Attorney, Agent, or Firm* — McBee Moore & Vanik, IP, LLC

(57) ABSTRACT

The present invention relates to a process for reducing haze in a beverage comprising adding a protein arginine deiminase and a proline-specific endoprotease during preparation of the beverage. The invention further relates to a wort or beer comprising a protein arginine deiminase and a proline-specific endoprotease.

6 Claims, No Drawings
Specification includes a Sequence Listing.

PROCESS FOR THE PREPARATION OF A STABLE BEVERAGE

CROSS-REFERENCE TO RELATED APPLICATIONS

This application is a continuation of U.S. application Ser. No. 17/040,771, filed 23 Sep. 2020, which is the National Stage entry of International Application No. PCT/EP2019/057531 filed 26 Mar. 2019, which claims priority European Patent Application No. 18164942.7, filed 29 Mar. 2018, the contents of each of which are hereby incorporated by reference in their entirety.

REFERENCE TO SEQUENCE LISTING SUBMITTED AS A COMPLIANT ASCII TEXT FILE (.xml)

Pursuant to the EFS-Web legal framework and 37 C.F.R. § 1.821-825 (see M.P.E.P. § 2442.03(a)), a Sequence Listing in the form of an ASCII-compliant text file (entitled "2919208-538001_Sequence_Listing.xml" created on 11 Jan. 2023, and 4,383 bytes in size) is submitted concurrently with the instant application, and the entire contents of the Sequence Listing are incorporated herein by reference.

BACKGROUND

Field

The present invention relates to a process for reducing haze in a beverage.

Description of Related Art

Haze is a well-known phenomenon in the beverage industry. Haze can be present in beer, wine and fruit juice. Haze formation can occur at different stages during a brewing process. In "Enzymes in food processing" edited by T. Nagodawithana and G. Reed, $3^{rd}$ edition, Academic press Inc., San Diego, Chapter V, p. 448-449, it has been proposed that haze in beer is the result of interactions between beer proteins and polyphenolic procyanidins. It is explained that in beer haze is often formed upon chilling of the beer. Beer is fermented, maturated, cold stabilised and finally packaged often under chilled conditions. To achieve clarity, beer is often filtered while cold. Despite the filtration, beer can often become cloudy after it is packaged and distributed to customers and chilled again for example before serving. Eventually haze can be even formed in beer when it is not, or no longer chilled and sediment may develop. Haze formation is undesirable because the cloudiness caused by haze formation resembles cloudiness produced by microbial spoilage, which is undesirable, especially for bright beers. Several processes for reducing haze in beverage are known in the art.

WO2002/046381 discloses a process for the reduction of haze in a beverage by adding a proline-specific endoprotease to the beverage.

EP1914298B1 discloses a process for the preparation of beer wherein a protein-deamidating enzyme, such as a peptide glutaminase or a protein deamidase, is added during the preparation of the beer. It is disclosed that by the addition of a protein-deamidating enzyme a beer-like beverage can be produced having mellowness, special flavor and good taste, and the solubility of protein that tends to become turbid may be improved.

WO2008/000714 discloses a protein arginine deiminase and the use of this enzyme in the preparation of a food product with an increased amount of citrulline.

WO2017/009100 discloses a process to improve the solubility of a plant protein, for instance pea, soy and rice protein, wherein the plant protein is incubated with a peptidyl arginine deiminase. The foam capacity of plant protein such as pea protein was reduced after incubation with peptidyl arginine deiminase.

There is a need for a further process for reducing haze in a beverage.

SUMMARY

The present invention relates to a process for reducing haze in a beverage comprising adding a protein arginine deiminase and a proline-specific endoprotease during preparation of the beverage.

The invention also relates to the use of a protein arginine deiminase and a proline-specific endoprotease to reduce haze in a beverage.

The invention also relates to wort or beer comprising a protein arginine deiminase and a proline-specific endoprotease.

DEFINITIONS

The term "derived from" as used herein in relation to the origin of an enzyme, such as enzyme having protein arginine deiminase or proline specific endoprotease activity, indicates that the enzyme is native to that microorganism In the scope of this invention, it is defined here that in order to determine the percentage of sequence identity of two amino acid sequences, the sequences are aligned for optimal comparison purposes. To optimize the alignment between the two sequences gaps may be introduced in any of the two sequences that are compared. Such alignment can be carried out over the full length of the sequences being compared. Alternatively, the alignment may be carried out over a shorter length, for example over about 20, about 50, about 100 or more amino acids. The sequence identity is the percentage of identical matches between the two sequences over the reported aligned region. The percent sequence identity between two amino acid sequences may be determined using the Needleman and Wunsch algorithm for the alignment of two sequences. (Needleman, S. B. and Wunsch, C. D. (1970) J. Mol. Biol. 48, 443-453). Both amino acid sequences and nucleotide sequences can be aligned by the algorithm. The Needleman-Wunsch algorithm has been implemented in the computer program NEEDLE. For the purpose of this invention the NEEDLE program from the EMBOSS package was used (version 2.8.0 or higher, EMBOSS: The European Molecular Biology Open Software Suite (2000) Rice, P. Longden, I. and Bleasby, A. Trends in Genetics 16, (6) pp 276-277, http://emboss.bioinformatics.nl/). For protein sequences EBLOSUM62 is used for the substitution matrix. The optional parameters used are a gap-open penalty of 10 and a gap extension penalty of 0.5. The skilled person will appreciate that all these different parameters will yield slightly different results but that the overall percentage identity of two sequences is not significantly altered when using different algorithms.

A "mature polypeptide" is defined herein as a polypeptide in its final form and is obtained after translation of a mRNA into a polypeptide and post-translational modifications of said polypeptide. Post-translational modifications include N-terminal processing, C-terminal truncation, glycosylation, phosphorylation and removal of leader sequences such as signal peptides, propeptides and/or prepropeptides by cleavage.

DETAILED DESCRIPTION

Disclosed herein is a process for reducing haze in a beverage comprising adding a protein arginine deiminase and a proline-specific endoprotease during preparation of the beverage.

Haze, also indicated as turbidity, or cloudiness, may be formed by interactions between proteins and polyphenols. The interactions usually result in a complex insoluble material comprising proteins and polyphenols.

Surprisingly, the amount of haze formed in a beverage when both protein arginine deiminase and proline-specific endoprotease are added during preparation of the beverage was less than the sum of haze reduced when either protein arginine deiminase or proline-specific endoprotease was added during preparation of the beverage. Surprisingly haze was reduced between 30% and 80%, for instance between 40% and 75%, such as between 50% and 75% relative to the amount of haze formed when no protein arginine deiminase and proline-specific endoprotease were added during preparation of the beverage.

It was also found that foam in beer was not affected when protein arginine deiminase and/or proline-specific endoprotease were added to the beer.

The wording "protein arginine deiminase" and "peptidyl arginine deiminase" are used interchangeable herein and is abbreviated with PAD. A PAD as disclosed herein may be any suitable enzyme having protein arginine deiminase activity. A PAD as disclosed herein belongs to a family of enzyme having enzyme classification number EC 3.5.3.15, which converts peptide or protein bound arginine into peptide or protein bound citrulline, also called citrullination. PAD as disclosed herein may be derived from any suitable origin, for instance from mammalian or microbial origin. PAD as disclosed herein is advantageously derived from a microbial source. For instance, PAD may be derived from fungal origin such as from *Fusarium* sp. such as *Fusarium graminearum, Chaetomium globosum, Phaesphaeria nodorum* or from bacterial origin such as from the bacteria *Streptomyces*, eg *Streptomyces* scabies, or *Streptomyces clavuligeres*. A PAD may be derived from a *Fusarium* sp., preferably a *Fusarium graminearum*.

Advantageously, peptidyl arginine deiminase is a polypeptide having peptidyl arginine deiminase activity which has at least 80%, 85%, 90%, 95%, 96%, 97%, 98%, 99% or 100% identity to the mature amino acid sequence of SEQ ID NO: 1, wherein the polypeptide has peptidyl arginine deiminase activity.

A mature polypeptide sequence of SEQ ID NO: 1 may comprise or contain amino acids 19, 20, 21, 22, 23, or 24 to 640 of the amino acid sequence of SEQ ID NO: 1, advantageously the mature polypeptide sequence of SEQ ID NO: 1 comprises or contains amino acids 22 to 640 of SEQ ID NO: 1, wherein methionine at position 1 in SEQ ID NO: 1 is counted as number 1.

A proline-specific endoprotease (PEP) as disclosed herein is a protease that hydrolyses a protein or peptide at a position where the protein or peptide contains a proline-residue. A proline-specific endoprotease may have proline-specific endoprotease and/or proline-specific oligopeptidase activity and belongs to enzyme classification number EC 3.4.21.26. A proline-specific endoprotease is preferably an enzyme that hydrolyses a peptide bond at the carboxy-terminal end of proline residues, resulting in a peptide and/or polypeptide fragment with a C-terminal proline.

A proline-specific endoprotease may be derived from any suitable microorganism, for instance the proline-specific endoprotease is derived from an *Aspergillus* sp., preferably *Aspergillus niger*.

A proline-specific endoprotease may be a polypeptide having proline-specific endoprotease activity which has least 80%, 85%, 86%, 87%, 88%, 89%, 90%, 91%, 92%, 93%, 94%, 95%, 96%, 97%, 98% or 99% identity to the mature polypeptide sequence of SEQ ID NO: 2. The mature polypeptide sequence of SEQ ID NO: 2 comprises, or has amino acids 37 to 521 of SEQ ID NO: 2, wherein methionine at position 1 in SEQ ID NO: 2 is counted as 1 The enzymes peptidyl-arginine deiminase and proline-specific endoprotease as disclosed herein can be produced by any fermentation process known in the art. Fermentation conditions typically depend on the host organism wherein the enzymes are produced. The enzymes can be expressed in a suitable host organism such as a *Bacillus, Pichia, Penicillium, Trichoderma* sp, or *Aspergillus* sp., such as *Bacillus subtilis, Pichia pastoris, Penicillium chrysogenum, Trichoderma reesei, Aspergillus niger* or *Aspergillus oryzae*. A suitable method to express a polypeptide having peptidyl arginine deiminase activity in *Aspergillus niger* is for instance disclosed in Examples 3 and 4 of WO2008/000714.

The enzyme can be recovered from culture broths by well-known methods, such as ammonium sulphate or ethanol precipitation, acid extraction, or anion or cation exchange chromatography. High performance liquid chromatography (HPLC) may be employed for purification.

A beverage in a process as disclosed herein can be fruit juice, wine or beer. A beverage in a process as disclosed herein may be beer. Beer can be prepared by any suitable process. Usually, a process for the preparation of beer comprises a mashing phase and a fermentation phase. Mashing usually comprises preparing a mash from a grist of unmalted cereals, from malted cereals or from a mixture of malted and unmalted cereals. A grist as used herein can also be a malt. Examples of cereals from which a mash and subsequently beer can be prepared are barley and wheat. In addition, mash and subsequently beer can be prepared with adjuncts such as maize, rice, sorghum, oats, or cassava.

Mashing, i.e. the process for preparing a mash, typically involves pauses (rests) at certain temperatures, for instance a pause at 43 to 51° C., a pause at 62 to 65° C., a pause at 72 to 74° C. and/or a pause at 77-78° C.

After mashing, the mash is usually filtered to obtain a wort, for instance by filtration through a Lautertun or mash filter. Subsequently, the wort is boiled. After boiling of the wort, the wort is cooled before fermenting of the wort. Fermenting wort is typically started by addition of yeast which converts the available sugars into alcohol, also known as primary fermentation. Fermenting of the wort in a process for preparing beer is usually performed at a temperature of between 5° C. and 20° C., for instance between 8° C. and 18° C., for instance between 10° C. and 14° C. Usually fermentation of beer takes 5 to 10 days, such as between 6 and 8 days, depending on the beer fermentation process applied. After fermentation a process for preparing beer usually comprises a maturation phase which is also known as the secondary fermentation. During maturation undesirable flavour components such as diketones are usually converted into better tasting components. During maturation the beer is cooled to a temperature of between −2° C. and 10° C., for instance between −1° C. and 5° C. or between 0° and 2° C. Following maturation, a process for preparing beer usually comprise a stabilisation phase. During stabilisation the formation of polyphenol-protein aggregates is promoted enabling precipitation. Maturation and stabilisation may take 1 to 10 days depending on the process conditions applied. Optionally, a process for preparing beer comprises a step of filtration, for instance after stabilisation. Usually the beer is packaged after stabilisation and/or filtration for instance in a bottle, a can or a keg. Usually, a process for preparing beer also comprises pasteurizing the beer.

Adding a protein arginine deiminase and a proline-specific endoprotease to a beverage in process as disclosed herein may be performed during any suitable step for preparing a beverage. A process for reducing haze in beer as disclosed herein may comprise adding the protein arginine deiminase and/or the proline-specific endoprotease to a wort during preparation of the beer. In one embodiment the protein arginine deiminase and/or the proline-specific endoprotease are added to the wort after filtering of the mash and before boiling of the wort A process for reducing haze in beer as disclosed herein may also comprise adding the protein arginine deiminase and/or the proline-specific endoprotease during and/or after fermentation of the beer.

Adding a protein arginine deiminase and/or a proline-specific endoprotease during preparation of the beverage usually comprises a step of incubating the protein arginine deiminase and/or the proline-specific endoprotease with the beverage or an intermediate form of the beverage before the final beverage is produced. In the event the beverage is beer, an intermediate form of the beverage may be wort. An intermediate form of a beverage may also be a beverage before it is pasteurized of sterilized. A process for reducing haze in a beverage as disclosed herein may comprise a step of pasteurizing the beverage. Pasteurizing and sterilizing a beverage are known processes to a person skilled in the art.

Incubating the protein arginine deiminase and/or the proline-specific endoprotease with the beverage or an intermediate form of the beverage, such as wort, may be performed during any suitable time, pH and temperature. When added during fermentation of beer, incubating the protein arginine deiminase and/or the proline-specific endoprotease may be performed at the temperature and during the period of fermenting the beer as disclosed herein above. Incubating the protein arginine deiminase and/or the proline-specific endoprotease with the beverage may also be performed during 0.5 to 8 hr or during 1 to 4 hrs at a temperature of between 20° C. and 50° C., for instance between 25° C. and 40° C. A suitable pH incubating may be between pH 3 and 7, such as between pH 4 and 6.

Also disclosed herein is the use of a protein arginine deiminase to reduce haze in a beverage. The use of a protein arginine deiminase to reduce haze in a beverage may further comprise the use of a proline-specific endoprotease. Accordingly, disclosed herein is the use of a protein arginine deiminase and a proline-specific endoprotease to reduce haze in a beverage. The features in the use for reducing haze in a beverage as disclosed herein are further outlined in the present description.

The present disclosure further relates to wort or beer comprising a protein arginine deiminase and a proline-specific endoprotease. Wort as used herein is a liquid obtained after mashing of malt and filtering the mash as disclosed herein above. Beer is a beverage obtained during a beer fermentation process for instance as disclosed herein above and known to a person skilled in the art. It was found that a wort or beer comprising a protein arginine deiminase and a proline-specific endoprotease comprises a lower amount of haze as compared to a wort of beer not comprising a protein arginine deiminase and a proline-specific endoprotease.

A protein arginine deiminase and a proline-specific endoprotease in a wort as disclosed herein are a protein arginine deiminase and a proline-specific endoprotease as defined herein above.

The wort or beer may comprise a protein arginine deiminase, wherein the protein arginine deiminase is or comprises a polypeptide having protein arginine deiminase activity which has at least 80%, or at least 85%, 86%, 87%, 88%, 89%, 90%, 91%, 92%, 93%, 94%, 95%, 96%, 97%, 98% or 99% identity to the mature amino acid sequence of SEQ ID NO: 1 and/or a proline-specific endoprotease which is or comprises a polypeptide having proline-specific endoprotease activity which has at least 80%, or at least 85%, 86%, 87%, 88%, 89%, 90%, 91%, 92%, 93%, 94%, 95%, 96%, 97%, 98% or 99% identity to the mature amino acid sequence of SEQ ID NO:2.

It was found that a wort comprising a protein arginine deiminase and a proline-specific endoprotease as disclosed herein resulted in a beer that was more stable than a beer prepared from a wort comprising protein arginine deiminase or proline-specific endoprotease alone.

EXAMPLES

Materials and Methods

Cloning and Expression of Peptidyl Arginine Deiminase (PAD) in *Aspergillus niger*

Cloning and expression of the peptidyl arginine deiminase was performed as disclosed in Examples 3 and 4 of WO2008/000714.
Proline-Specific Endoprotease from *Aspergillus niger*

A commercial sample of proline-specific endoprotease from *A. niger*, Brewers Clarex® (5 PPU/g product, obtainable from DSM) was used. The activity of proline-specific endoprotease was measured on the synthetic peptide Z-Gly-Pro-pNA at 37° C. in a citrate/disodium phosphate buffer pH 4.6. The reaction products were monitored spectrophotometrically at 405 nm.

One unit (1 PPU) is defined as the quantity of enzyme that liberates 1 μmol of p-nitroanilide per minute under these test conditions.
Protein Determination The protein content in the PAD sample was determined using a Bradford assay kit (Pierce no. 23236) and a calibration line made with BSA. The Bradford assay protocol was followed according to the recommendations of the supplier.
Haze Sensitive Protein (HSP) Analysis Haze sensitive proteins were measured with a Tannometer using the Pfeuffer operating instructions for this method. Tannic acid was added to the samples and the haze measured under 90 degree scatter angle expressed in EBC units and reported for the addition of 2.5, 5 and 10 mg/l tannic acid (HSP2.5, HSP 5, HSP10).

Example 1. Haze Sensitive Proteins in Wort Treated with Peptidyl Arginine Deiminase, Proline-Specific Endoprotease and the Combination of these Two Enzymes Wort was produced in the BRUMAS BrauEule brewing set-up, using 4.7 kg barley malt (Extra Pale Premium Pilsner Malt, 0108 Bamberg Germany) and 20 l water. The mashing diagram included a first step of 50° C. for 15 minutes, a second step at 63° C. for 15 minutes, a third step at 75° C. for 15 minutes and finally a mash off at 78° C. for 5 minutes. After mashing-off, the mash was filtered in a Lauter tun; first wort recycling was applied and a total of 10l wash water was added towards the end of filtration. The resulting wort was boiled for 95 minutes after which good trub separations were performed with a whirlpool.

Subsequently, the wort was incubated in the presence and absence of protein arginine deiminase and/or a proline-specific endoprotease to determine their effect on the total amount of haze sensitive proteins in the wort. For this purpose, 10 g of wort was incubated without enzyme, with 4 μg/ml peptidyl arginine deiminase (PAD), with 1 mPPU/ml proline-specific endoprotease (PEP) and with a combination of 4 μg/ml peptidyl arginine deiminase and 1 mPPU/ml proline-specific endoprotease at 40° C. for 2 hours. After the incubation, the reactions were centrifuged at 5° C. at 4000 rpm for 30 min. The supernatant was used in the haze sensitive protein analysis as described above.

The results in Table 1 show that PAD and the PEP both decrease the amount of haze-sensitive proteins in the wort compared to the blank wort incubated without the addition of any enzyme. The addition of both PAD and PEP to wort resulted in the lowest amount of haze-sensitive proteins in the wort.

TABLE 1

Amount of haze-sensitive proteins (EBC units) in wort samples after addition of 2.5, 5 and 10 mg/l tannic acid, and after incubation with and without enzymes.

| Reaction | HSP2.5 (EBC units) | HSP5 (EBC units) | HSP10 (EBC units) |
|---|---|---|---|
| Blank-no enzyme | 3.2 | 8.1 | 15.1 |
| PAD 4 μg/ml | 3.1 | 7.4 | 14.4 |
| PEP 1 mPPU/ml | 1.4 | 4.2 | 10.6 |
| PAD 4 μg/ml + PEP 1 mPPU/ml | 0.8 | 2.9 | 7.6 |

Example 2: Effect of Peptidyl Arginine Deiminase and Proline-Specific Endoprotease on Foam Stability in Beer The effect of PAD and PEP addition to beer on the beer's foam stability was evaluated. The following enzyme combinations were added to commercial beer bottles (Heineken, 300 ml): PEP (0.5 PPU/bottle), PAD (16.7 μg/bottle), PEP (0.5 PPU/bottle) and PAD (16.7 μg/bottle), PEP (0.5 PPU/bottle) and PAD (167 μg/bottle), and as a control no enzyme. The bottles were recapped and after incubation for five days at 20° C., a foam stability test was executed according to EBC method 9.42 using the Haffmans Foam stability tester Nibem-TPH. After making reproducible foam from the beer, the foam collapse time over a distance of 30 mm was determined with the NIBEM-TPH. The data in Table 2 show that addition of PAD, PEP and a combination of PEP and PAD did not affect the foam stability of beer.

TABLE 2

Foam collapse time over a distance of 30 mm for beers incubated with and without enzymes.

| Incubation | Foam collapse time 30 mm (s) |
|---|---|
| No enzyme | 282 |
| PAD (16.7 μg/bottle) | 280 |
| PEP (0.5 PPU/bottle) | 279 |
| PEP (0.5 PPU/bottle) and PAD (16.7 μg/bottle) | 281 |
| PEP (0.5 PPU/bottle) and PAD (167 μg/bottle) | 281 |

The invention claimed is:

1. A process for reducing haze in a beer, without affecting foam stability of the beer, the process comprising adding a protein arginine deiminase in E.C. 3.5.3.15, and a proline-specific endoprotease in E.C. 3.4.21.26, during preparation of the beer.

2. The process of claim 1, wherein foam stability is measured according to EBC method 9.42 using a Haffmans Foam stability tester Nibem-TPH.

3. The process of claim 1, wherein adding the protein arginine deiminase and the proline-specific endoprotease comprises adding the protein arginine deiminase and/or the proline-specific endoprotease to a wort during preparation of the beer.

4. The process of claim 3, wherein the protein arginine deiminase and/or the proline-specific endoprotease is/are added after filtration of mash and before boiling of the wort.

5. The process of claim 1, wherein adding the protein arginine deiminase and/or the proline-specific endoprotease, comprises adding the protein arginine deiminase and/or the proline-specific endoprotease during and/or after fermentation of the beer.

6. A beverage composition comprising a protein arginine deiminase in E.C. 3.5.3.15 and a proline-specific endoprotease in E.C. 3.4.21.26, wherein the beverage is a beer or a wort.

* * * * *

SEQUENCE LISTING

```
Sequence total quantity: 2
SEQ ID NO: 1              moltype = AA   length = 640
FEATURE                   Location/Qualifiers
source                    1..640
                          mol_type = protein
                          organism = Fusarium graminearum
SEQUENCE: 1
MHLLNGKTAA VALALLNSCN ALKVTILADT NRDGKVDNND INGKSTWTNN RGALILPNIG  60
DTGSRCAKQW GPSVDIQGDE SYLDKCNDAS DNVQRNPKYL ASLKTLPLTT LSATAKGSII 120
IADKTGASKV RIFVKQSGKW NYVAADHVFT AKELKSGLEL GVDARDVRRP QDWNGYAKIQ 180
FTVTDGKTKA TDAVAVRVAP VLTHHHGQHA QRIFTTGVNE AGVNKVQETF IADILRNVAG 240
AGIKEPVFQF HNQDIWTQDF FEPGYASIPG PNGPVSIRIM IRSAQSSRRS GRDAFHDLRN 300
DQVGAVQHPG DGDSIDSTGN LETIPPYSHN GKSFPVGRTI MGAWDGRAPL MVEFLKAQQV 360
QEPLILDTSW LYVGHVDEFI QFLPSNNKLG WVIMVADPMK GVDLLKKAVK TGHGKVKAVS 420
RPLSADEKKE QLCLPRQTIA EALKFKSFDA INKHSAERIQ ANLDIIKRET GITDEDIHRV 480
PALFYYTQSN SWLCPGETAE DDSAQPQKAA SNSGITMKTS QGGPGFKAKS IVEAATPGKS 540
IQRRVIDPAT QVTALYPGSV NGLVMTDTKI LAPSPWGPVI NKQDIFAAAV SQVYTNAGYN 600
VTYQDDWFSH FKLQGDVHCG SNSWREIPKK WWDSLRVNNY                      640

SEQ ID NO: 2              moltype = AA   length = 521
FEATURE                   Location/Qualifiers
REGION                    1..521
                          note = Protein sequence of A. niger proline-specific
                           endoprotease with pectinemethylesterease signal sequence
source                    1..521
                          mol_type = protein
                          organism = synthetic construct
SEQUENCE: 2
```

-continued

```
MVKSILASVF FAATALAARP RLVPKPVSRP ASSKSAATTG EAYFEQLLDH HNPEKGTFSQ    60
RYWWSTEYWG GPGSPVVLFT PGEVSADGYE GYLTNETLTG VYAQEIQGAV ILIEHRYWGD   120
SSPYEVLNAE TLQYLTLDQA ILDMTYFAET VKLQFDNSTR SNAQNAPWVM VGGSYSGALT   180
AWTESVAPGT FWAYHATSAP VEAIYDYWQY FYPIQQGMAQ NCSKDVSLVA EYVDKIGKNG   240
TAKEQQALKE LFGLGAVEHF DDFAAVLPNG PYLWQDNDFA TGYSSFFQFC DAVEGVEAGA   300
AVTPGPEGVG LEKALANYAN WFNSTILPDY CASYGYWTDE WSVACFDSYN ASSPIYTDTS   360
VGNAVDRQWE WFLCNEPFFY WQDGAPEGTS TIVPRLVSAS YWQRQCPLYF PETNGYTYGS   420
AKGKNAATVN SWTGGWDMTR NTTRLIWTNG QYDPWRDSGV SSTFRPGGPL ASTANEPVQI   480
IPGGFHCSDL YMADYYANEG VKKVVDNEVK QIKEWVEEYY A                      521
```